US012694425B2

(12) United States Patent
Shtoff et al.

(10) Patent No.: US 12,694,425 B2
(45) Date of Patent: Jul. 28, 2026

(54) SYSTEM AND METHOD FOR IMPROVING CONVERSION RATE PREDICTION VIA SELF-SUPERVISED PRETRAINING IN ONLINE ADVERTISING

(71) Applicant: YAHOO ASSETS LLC, New York, NY (US)

(72) Inventors: Alex Shtoff, Haifa (IL); Ariel Raviv, Haifa (IL); Yohay Kaplan, Haifa (IL)

(73) Assignee: YAHOO ASSETS LLC, New York, NY (US)

( * ) Notice: Subject to any disclaimer, the term of this patent is extended or adjusted under 35 U.S.C. 154(b) by 286 days.

(21) Appl. No.: 18/468,003

(22) Filed: Sep. 15, 2023

(65) Prior Publication Data

US 2025/0095025 A1 Mar. 20, 2025

(51) Int. Cl.
| | |
|---|---|
| *G06Q 30/0242* | (2023.01) |
| *G06N 5/022* | (2023.01) |
| *G06Q 30/0202* | (2023.01) |
| *G06Q 30/0241* | (2023.01) |
| *G06Q 30/0273* | (2023.01) |

(52) U.S. Cl.
CPC ......... G06Q 30/0246 (2013.01); G06N 5/022 (2013.01); G06Q 30/0202 (2013.01); G06Q 30/0275 (2013.01); G06Q 30/0277 (2013.01)

(58) Field of Classification Search
None
See application file for complete search history.

(56) References Cited

U.S. PATENT DOCUMENTS

| | | | | |
|---|---|---|---|---|
| 2010/0030647 A1* | 2/2010 | Shahshahani | .......... | G06Q 30/02 |
| | | | | 705/14.66 |
| 2019/0043095 A1* | 2/2019 | Grimaud | ........... | G06Q 30/0201 |
| 2019/0080363 A1* | 3/2019 | Acuna Agost | .......... | G06N 7/01 |
| 2021/0035163 A1* | 2/2021 | Peris | .................. | G06Q 30/0275 |
| 2023/0315781 A1* | 10/2023 | Huang | .................. | G06F 16/535 |
| | | | | 707/734 |

* cited by examiner

*Primary Examiner* — Allan J Woodworth, II
(74) *Attorney, Agent, or Firm* — Venable LLP

(57) ABSTRACT

The present teaching relates to online advertising. Bids directed to a display ad opportunity are received, where the display ad opportunity involves a user and an associated context and each bid includes a candidate advertisement. Auxiliary features are obtained for each bid based on a code generated by an autoencoder based on the bid and a predicted performance metric is determined for the candidate advertisement associated with the bid based on the auxiliary features associated with the bid. A winning advertisement is selected from candidate advertisements of the bids according to a ranking determined based on the respective predicted performance metrics of the candidate advertisements.

20 Claims, 13 Drawing Sheets

100

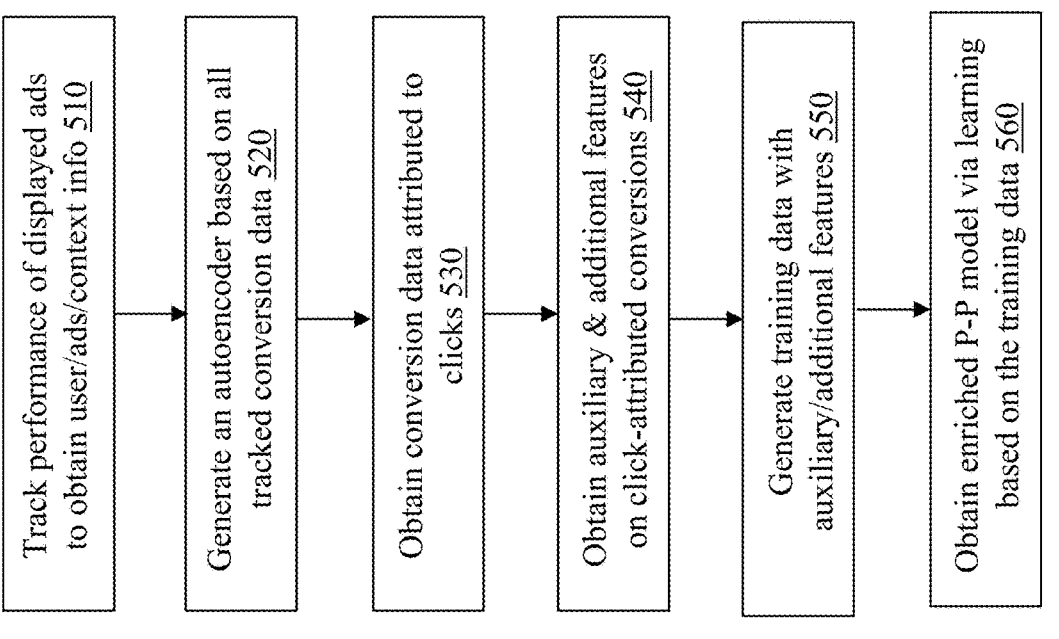

Track performance of displayed ads to obtain user/ads/context info 510

Generate an autoencoder based on all tracked conversion data 520

Obtain conversion data attributed to clicks 530

Obtain auxiliary & additional features on click-attributed conversions 540

Generate training data with auxiliary/additional features 550

Obtain enriched P-P model via learning based on the training data 560

Fig. 5A

Receive bids related to an ad display opportunity with candidate ads 505

Obtain additional features associated with each candidate ad 515

Obtain auxiliary feature for each candidate ad 525

Predict performance on each candidate ad via enriched model 535

Rank candidate ads based on the predicted performance metrics 545

Select a winning ad based on the ranking 555

SYSTEM AND METHOD FOR IMPROVING CONVERSION RATE PREDICTION VIA SELF-SUPERVISED PRETRAINING IN ONLINE ADVERTISING

BACKGROUND

1. Technical Field

The present teaching generally relates to data analytics. More specifically, the present teaching relates to data analytics in online advertising.

2. Technical Background

With the development of the Internet and the ubiquitous network connections, more and more commercial and social activities are conducted online. Networked content is served to millions, some requested and some recommended. Platform operators that make electronic content available to users may leverage their online presence to solicit advertisements (ads) to be displayed together with content to users. For each ad display opportunity, mechanisms may be put in place where many available ads may be evaluated with respect to, e.g., its estimated performance so that a winning ad may be selected and then displayed. A winning ad may be identified as one that maximizes the estimated performance or financial return, estimated based on multi-dimensional features associated with the context the ad display opportunity. Some metrics used to measure performance in online advertising include a click through rate (CTR) and a conversion rate (CVR). To facilitate winning bid selection, ads to be considered for an ad display opportunity may be ranked based on their respective estimated performance metrics. Traditionally, a probability of achieving a conversion (pCVR) may be estimated for each candidate ad and then the ranking may be carried out based on the value of pCVR.

FIG. 1A illustrates a conventional system to select a winning ad based on performance (P-P) metrics for candidate ads predicted using prediction models learned via training. In this conventional system configuration, when a display ad opportunity is presented, data 105 surrounding the opportunity may be gathered, including user features 105-1, context features 105-2, and features associated with the candidate ads 105-3. Such data may be used by a performance prediction unit 110 to predict, based on a performance prediction model 120, the estimated P-P metrics for the candidate ads. An ad ranking unit 130 may then rank the candidate ads based on their P-P metrics and a winning ad selection unit 140 may then select a winning ad based on the ranking result. In this conventional framework, the performance prediction model 120 may be obtained by a performance prediction model training unit 170 via learning using training data 160, collected by an online ad performance tracker 150.

Some conversions may be due to clicks, but some conversions are not attributed by clicks. Traditionally, a model for predicting conversion rate is learned based on the attribution relationship between clicks and conversions. That is, conversions attributed to clicks are used as positive events and clicks without conversion are used as negative events. A conventional winning ad selection framework such as the one illustrated in FIG. 1A provides click-attributed conversion data 160 (including user features 160-1, context features 160-2, ad features 160-3, and performance data 160-4) for training the performance prediction model 120.

An issue associated with this traditional learning scheme is the quality of the model due to the sparsity issue associated with the click-attributed conversion training data. The sparsity issue is because clicks are rare, and conversions are even more so. As a result, performance prediction models trained based on such sparse data usually achieve limited accuracy.

This is shown in FIG. 1B, where the performance prediction model 120 established based on only click-attributed conversion data 160 is used to predict performance metrics for different candidate ads. In some implementations, additional features may also be incorporated in learning the performance prediction model and used for prediction (FIGS. 1A and 1B), because such additional features usually correspond to ones that are not separable between users and ads (e.g., how often and how recent a used has seen an ad), they are not capable of remedying the data sparsity issue and improve the accuracy concern of a trained prediction model. FIG. 1C shows an exemplary implementation of a performance prediction model 120 based on an artificial neural network, which is trained based on click-attributed conversion data. In using this exemplary implementation to predict performance of a candidate ad, a first embedding layer 120-1 with trained embedding parameters is used for generating feature vectors for user/candidate ad/contextual data, a first combine layer 120-2 is trained for combining feature vectors from the embedding layer 120-1 to generate a combined feature vector, a second embedding layer 120-3 is trained for generating an additional feature vector for additional features, a second combine layer 120-4 is trained for combining the combined feature vector with the additional feature vector to produce an overall combined vector, and an output layer 120-5 trained to take the overall combined vector from 120-4 as input and produces a predicted performance metric (e.g., pCVR) for the candidate ad.

It is commonly noted, however, that most ad networks have vast amounts of data on conversions that are not attributed to clicks. Such data carry much useful contextual information and yet they are currently not leveraged in performance prediction in online advertising. Thus, there is a need for a solution that can enhance the performance of the traditional approaches.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for online advertising. Bids directed to a display ad opportunity are received, where the display ad opportunity involves a user and an associated context and each bid includes a candidate advertisement. Auxiliary features are obtained for each bid based on a code generated by an autoencoder based on the bid and a predicted performance metric is determined for the candidate advertisement associated with the bid based on the auxiliary features associated with the bid. A winning advertisement is selected from candidate advertisements of the bids according to a ranking determined based on the respective predicted performance metrics of the candidate advertisements.

In a different example, a system is disclosed for displaying ads that includes a performance prediction unit and a winning ad selection unit. The performance prediction unit is provided for processing bids directed to a display ad opportunity, wherein each of the bids includes a candidate advertisement and the display ad opportunity involves a user and an associated context. The performance prediction unit then predicts, via an enriched performance prediction model, a predicted performance metric for the candidate advertisement in each of the bids based on auxiliary features with respect to each of the bids based on a code generated by an autoencoder for the bid associated with the candidate advertisement. The winning ad selection unit is provided for selecting the winning advertisement from candidate advertisements of the bids according to a ranking determined based on the respective predicted performance metrics of the candidate advertisements.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for online advertising. Bids directed to a display ad opportunity are received, where the display ad opportunity involves a user and an associated context and each bid includes a candidate advertisement. Auxiliary features are obtained for each bid based on a code generated by an autoencoder based on the bid and a predicted performance metric is determined for the candidate advertisement associated with the bid based on the auxiliary features associated with the bid. A winning advertisement is selected from candidate advertisements of the bids according to a ranking determined based on the respective predicted performance metrics of the candidate advertisements.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5A is a flowchart of an exemplary process for training an autoencoder and an enriched performance prediction model via training data, in accordance with an embodiment of the present teaching;

DETAILED DESCRIPTION

Figure 1A:
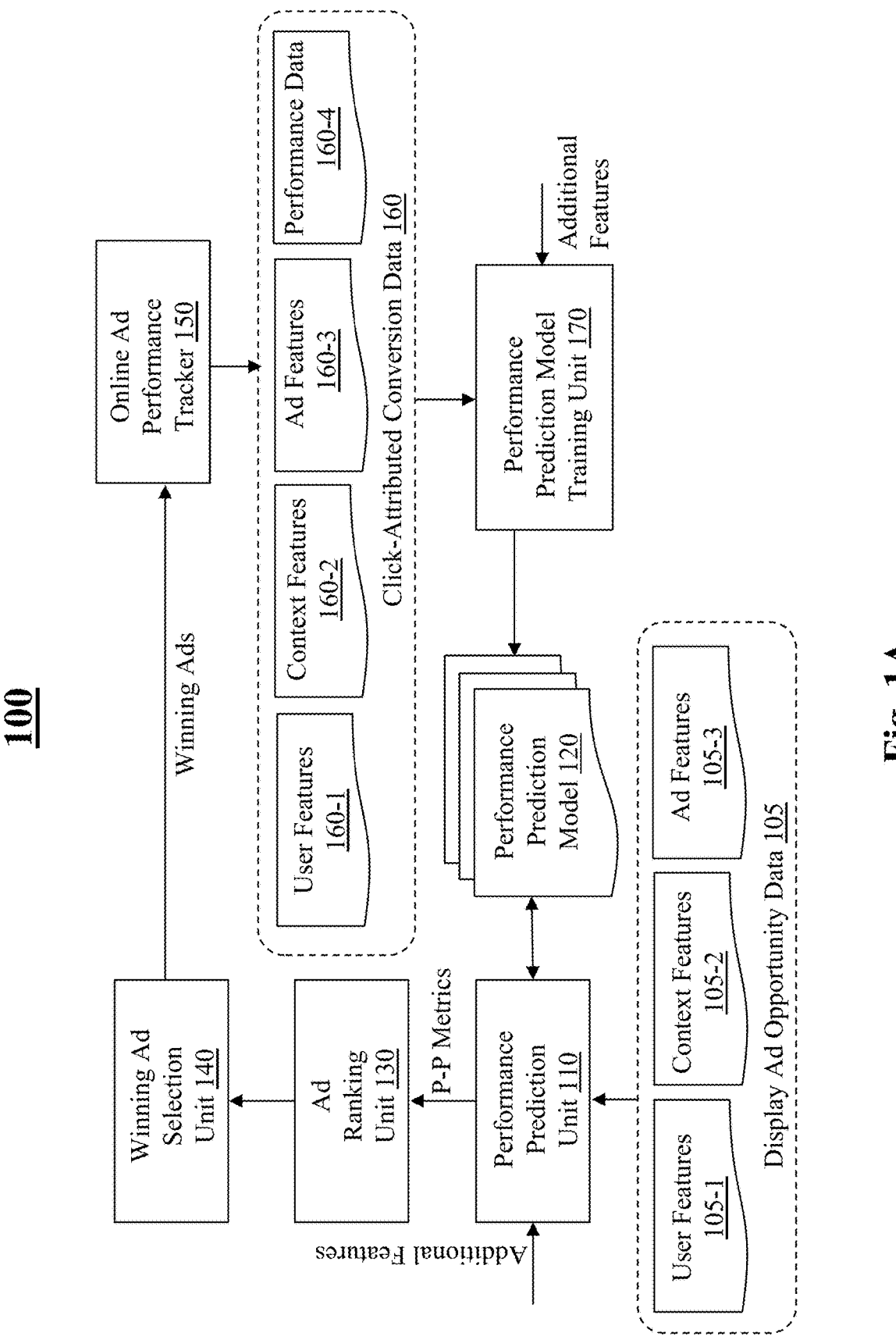
FIG. 1A shows a conventional framework for selecting a winning ad based on performance metrics predicted by a prediction model trained using click-attributed conversion data.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses an approach to remedy the problem in online advertising due to data sparsity by providing auxiliary features from an autoencoder based on both click attributed and non-click attributed conversion data and preserving desired latency in performance metrics prediction to enable ranking candidate ads on-the-fly in online advertising. For online ad bid optimization, different variant models of Factorization Machine have been used to predict, for each ad, a performance metric such as a conversion rate (pCVR) given a click, given the input information about the ad and contextual information related to a user. A prediction model for estimating a pCVR corresponds to a CVR performance may approximate a true CVR on any traffic segment.

Some factorization machine models may have been developed for performance prediction and they may be trained using, e.g., a logistic regression framework involving positive and negative events. The training may be performed incrementally on an infinite stream of data because model freshness may be of paramount importance for the performance in a dynamically changing environment. As discussed herein, training a CVR prediction model poses some key challenges, one of which is data sparsity. An accurate model requires a large amount of data, which is not always available. For example, typically only a few percent of the impressions result in clicks, and a few percent of the clicks result in conversions. Thus, the number of click-attributed conversions that may be used for training is quite small so that the coverage of various feature combinations can be problematic.

Although the training data may be enriched, such as non-click attributed conversions or impression data in addition to clicks, it is unclear as to how to assign events with labels in order to produce a calibrated model. The aim is to enrich the prediction model without impairing the calibration. The approach of self-supervised pre-training is adopted according to the present teaching to achieve that. Self-supervised pre-training may be achieved by deploying an auxiliary autoencoder model that is trained on all conversion events, including both click-attributed and non-click attributed. Such a trained autoencoder may then be used as a feature extractor to provide auxiliary featured in training and prediction to enrich a performance prediction model.

With this scheme, as the performance prediction model is not trained on non-click attributed conversion data, the enriched prediction model does not impair the original calibration. In addition, continual learning based on continuously collected training data may ensure the stability and adaptivity of the auxiliary autoencoder. In some embodiments, the autoencoder may be implemented using an ANN learned via training based on all conversion data, including both click and non-click attributed conversions. With these properties, the disclosed scheme according to the present teaching may be incorporated into a large-scale real-time ad auction so that an enriched performance prediction model can be used for more accurate prediction of performance of tens of thousands of ads to facilitate ads ranking on-the-fly, while conforming to the strict latency constraints without incurring a major engineering cost.

Figure 1B:
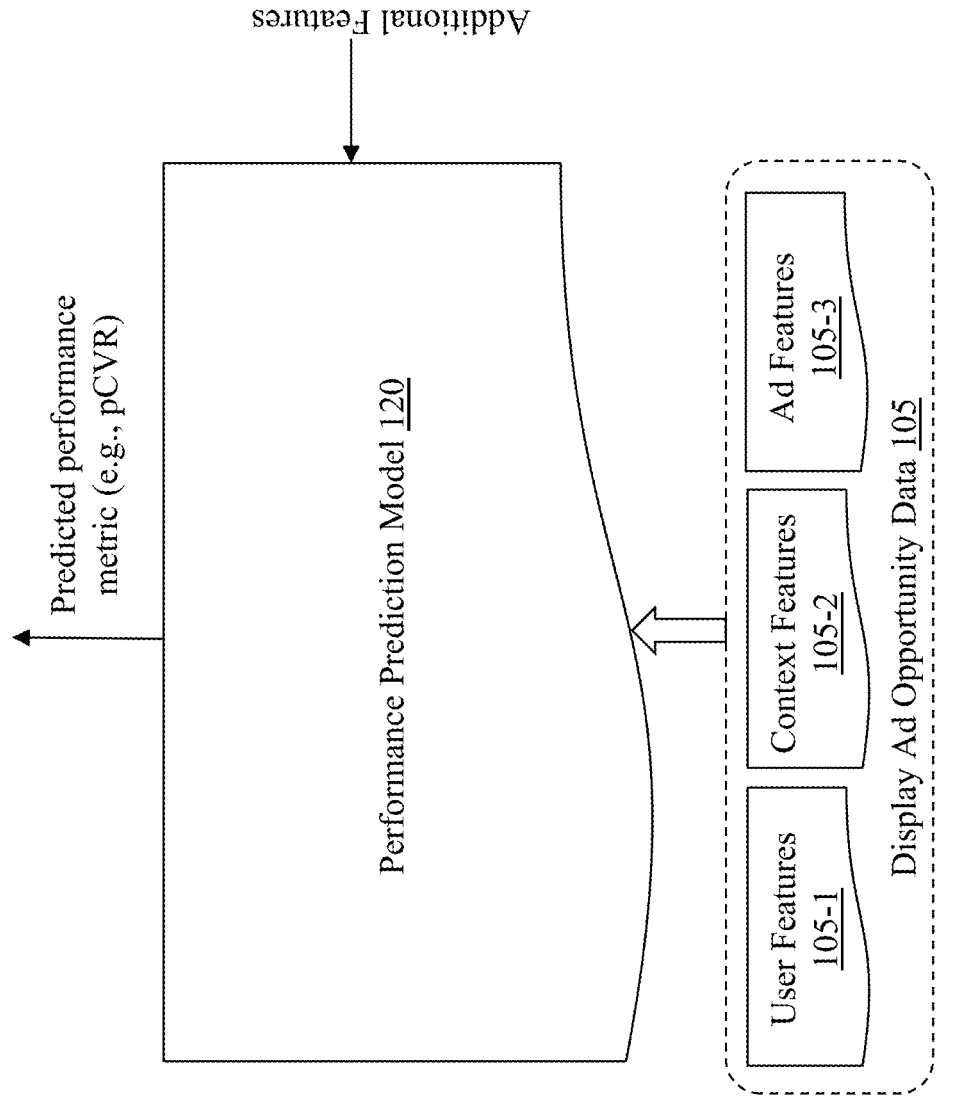
FIG. 1B shows a performance prediction model predicting performance metrics based on given input.
Figure 1C:
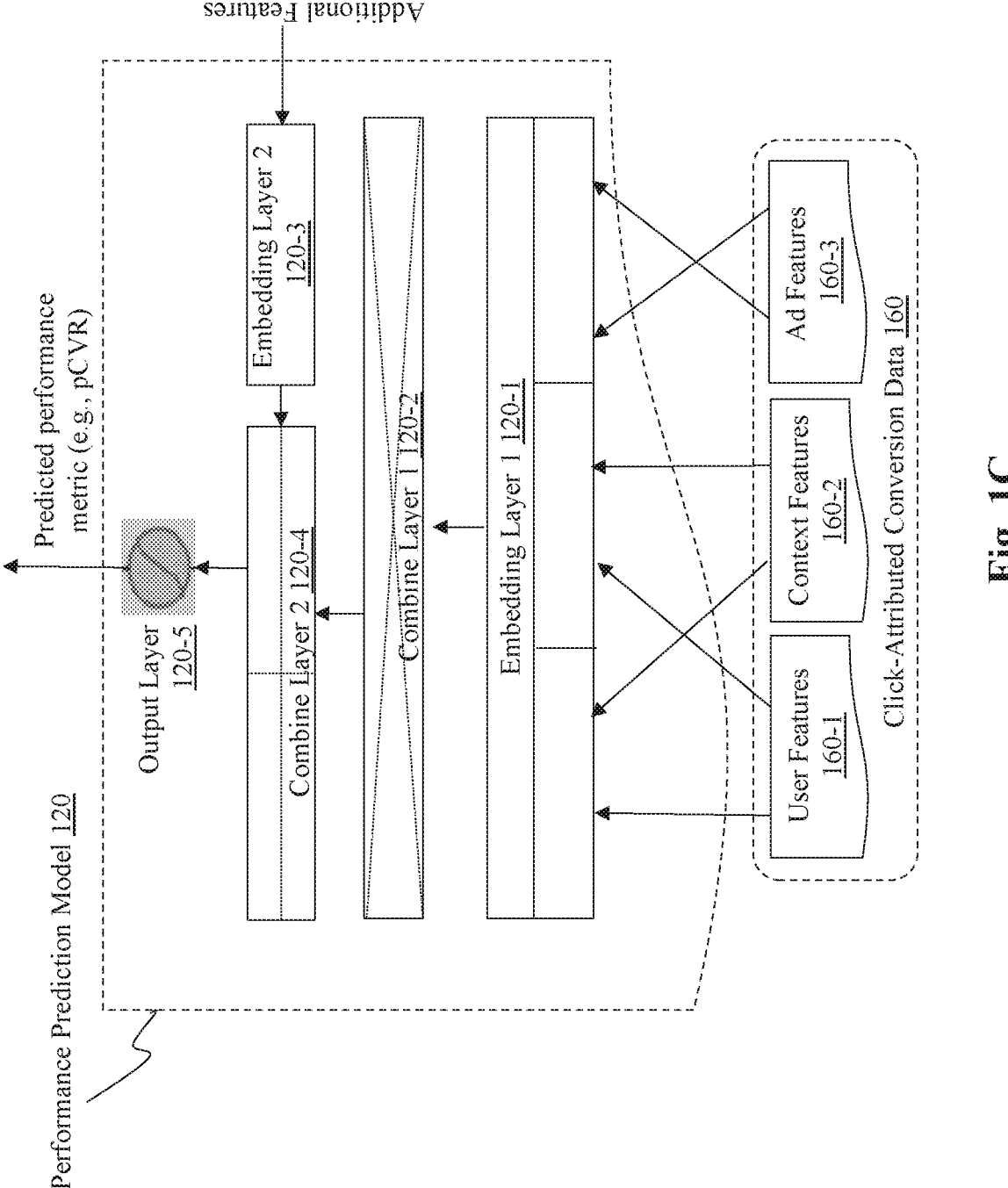
FIG. 1C illustrates an exemplary performance prediction model implemented with an ANN architecture for predicting performance metrics of ads; a FIG. 2A depicts an exemplary enriched performance prediction model that estimates performance metrics based on auxiliary features that characterize both click and non-click attributed conversion data, in accordance with an embodiment of the present teaching.
Figure 2A:
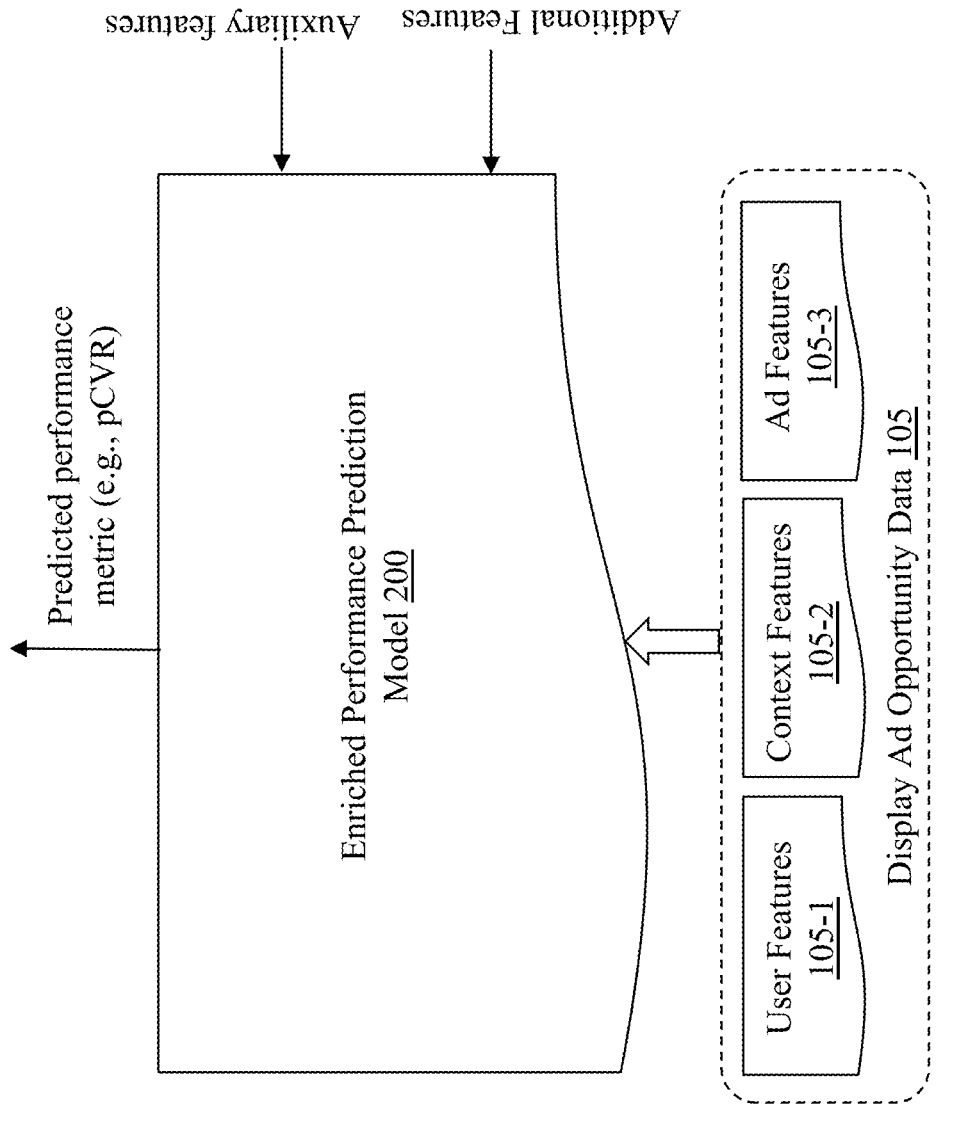
FIG. 2B depicts an exemplary ANN implementation of an enriched performance prediction model for predicting ad performance based on auxiliary features, in accordance with an embodiment of the present teaching.

FIG. 2A depicts an exemplary enriched performance prediction model 200 that estimates performance metrics of an ad based on auxiliary features from an auxiliary autoencoder trained based on both click and non-click attributed conversion data, in accordance with an embodiment of the present teaching. Compared with the conventional performance prediction model 120 as shown in FIG. 1B, where the convention performance prediction model 120 suffers from data sparsity problem, the enriched performance prediction model 200 takes additional auxiliary features as input as well for predicting performance of an ad by leveraging the knowledge embedded in the additional auxiliary features and learned from both click and non-click attributed conversion data. It is the auxiliary features that remedies data sparsity yet incorporation of which as an input in predicting the performance does not negatively impact the latency.

Figure 2B:
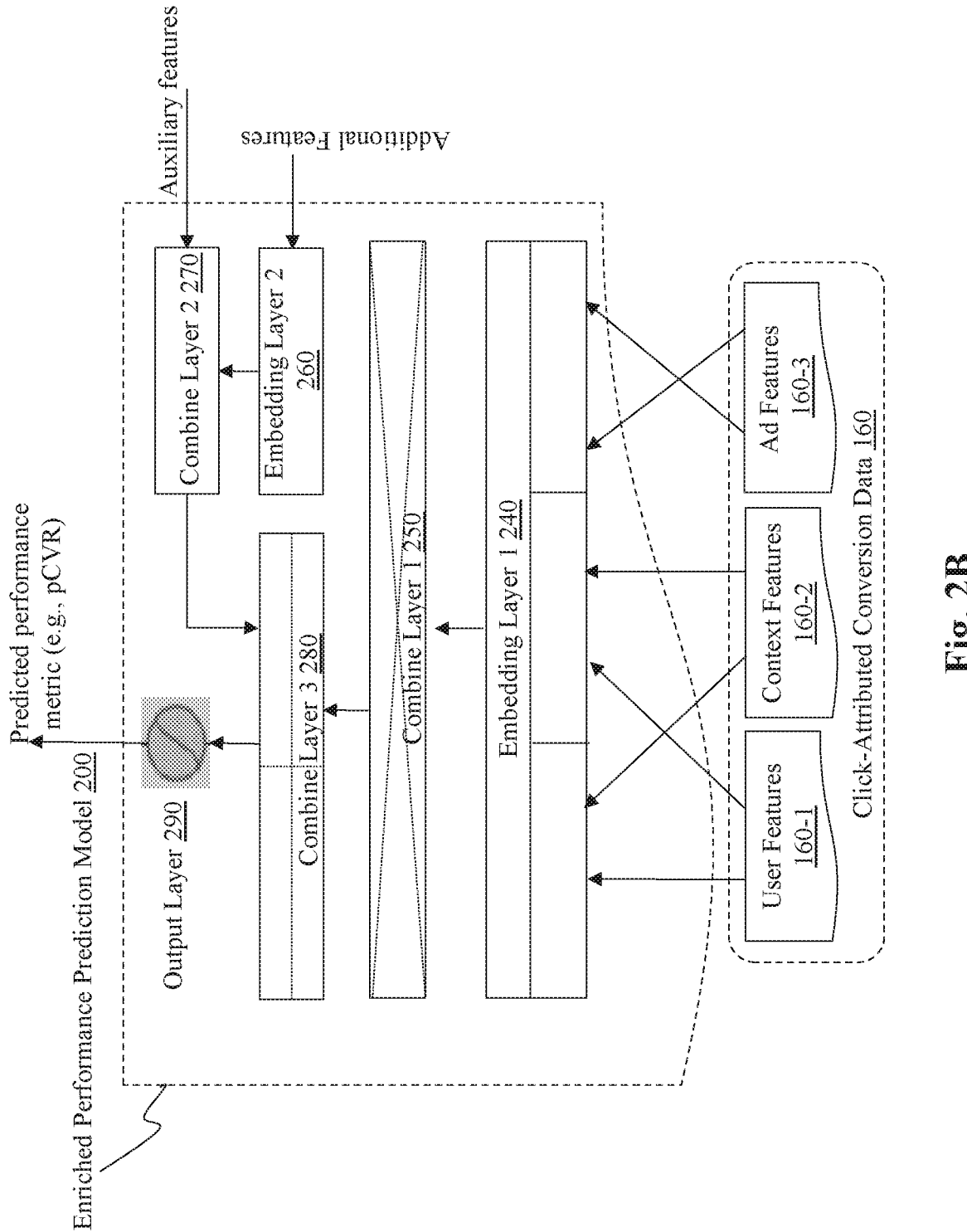

FIG. 2B depicts an exemplary ANN implementation of the enriched performance prediction model 200 trained based on auxiliary features, in accordance with an embodiment of the present teaching. In this illustrated embodiment, the enriched performance prediction model 200 includes multiple layers, including a first embedding layer 240, a first combine layer 250, a second embedding layer 260, a second combine layer 270, a third combine layer 280, and an output layer 290. Each of these different layers include various parameters that may be learned during training. The first embedding layer 240 may include different parts, each of which may be for generating features vectors for user, context, and ad information, respectively. The first combine layer 250 may be provided for combining the feature vectors obtained by the first embedding layer 240 for user, ad, and context to generate a combined input feature vector.

The second embedding layer 260 may be provided for generating a feature vector for the input additional features and the second combine layer 270 may be provided for combine the feature vector for additional features with auxiliary features from the auxiliary autoencoder to produce a combined external feature vector. The third combine layer 280 may be provided for combining the combined input feature vector and the combined external feature vector to produce an overall vector, which is then used by the output layer 290 to generate a predicted performance metric such as a pCVR. The learnable parameters in this exemplary ANN architecture may be learned iteratively based on click-attributed training data as well as external features (additional features and auxiliary features) against some convergence condition until the convergence condition is satisfied.

Figure 3A:
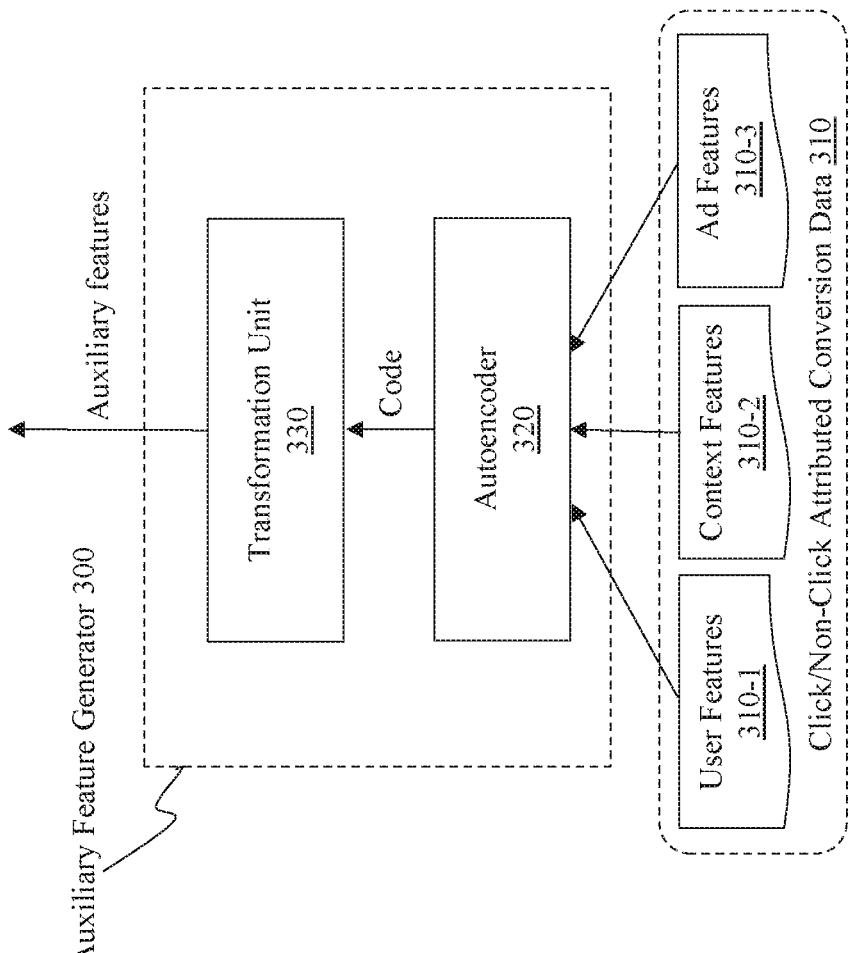
FIG. 3A depicts an exemplary high-level system diagram of an auxiliary feature generator based on a code from an autoencoder, in accordance with an embodiment of the present teaching.

With this exemplary ANN implementation, through the training, the enriched performance prediction model 200 learns from not only click-attributed conversion training data 160 but also non-click attributed conversation data through the auxiliary features. FIG. 3A depicts an exemplary high-level system diagram of an auxiliary feature generator 300 for providing auxiliary features based on a code from an autoencoder, in accordance with an embodiment of the present teaching. In this illustrated embodiment, the auxiliary feature generator 300 is created via training based on click/non-click attributed conversion data 310 and includes an autoencoder 320 and a transformation unit 330. Once trained, the autoencoder 320 is then used to generate a code based on data associated with a bid in ad in an ad bidding process with information related to a user, an ad, and contextual data associated with the bid. The code is then transformed via the transformation unit 330 to output auxiliary features with respect to a bid.

Figure 3B:
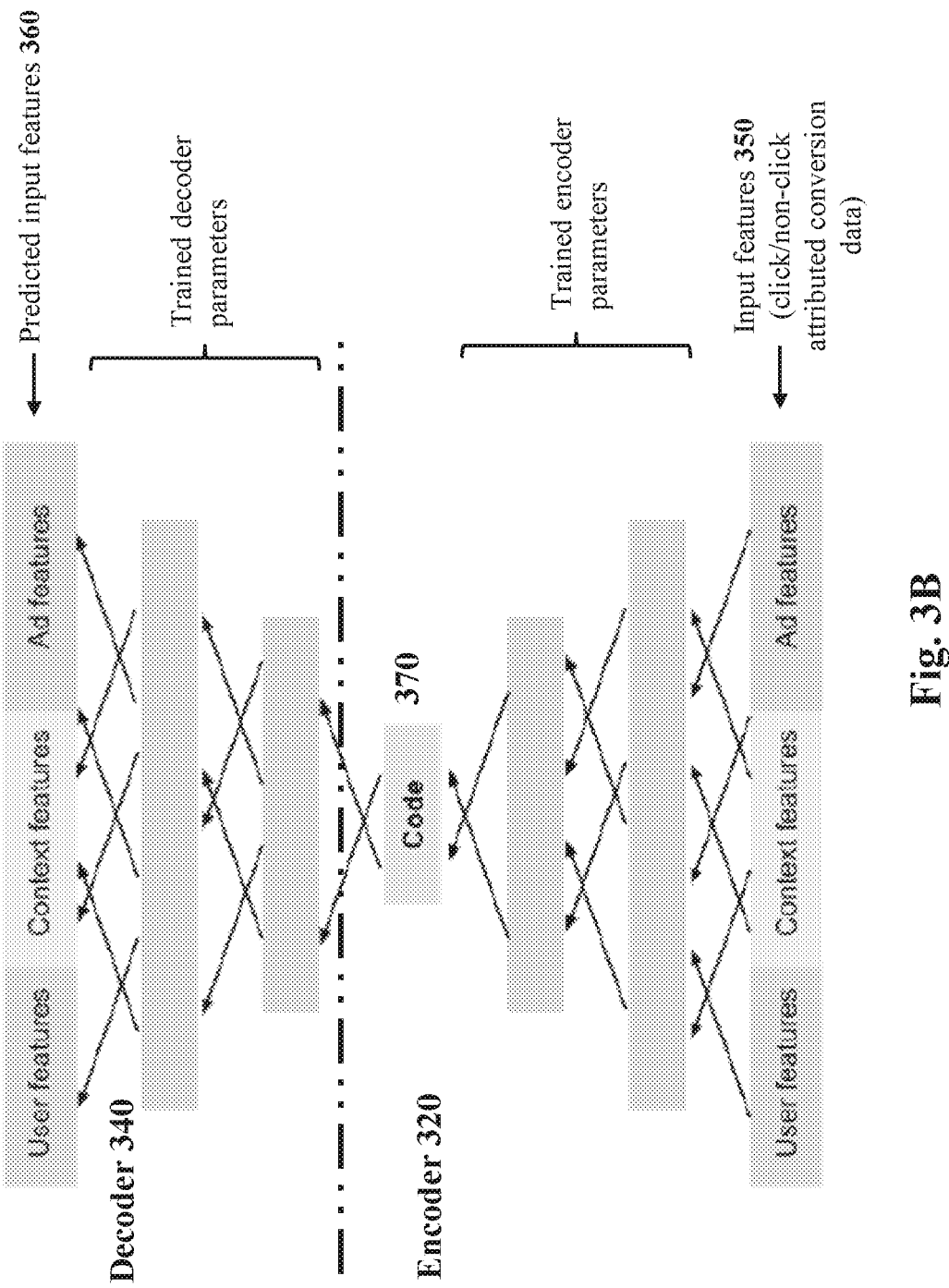
FIG. 3B shows an exemplary multi-layer architecture of an autoencoder for generating a code based on both click-attributed and non-click-attributed conversion data, in accordance with an embodiment of the present teaching.
Figure 3C:
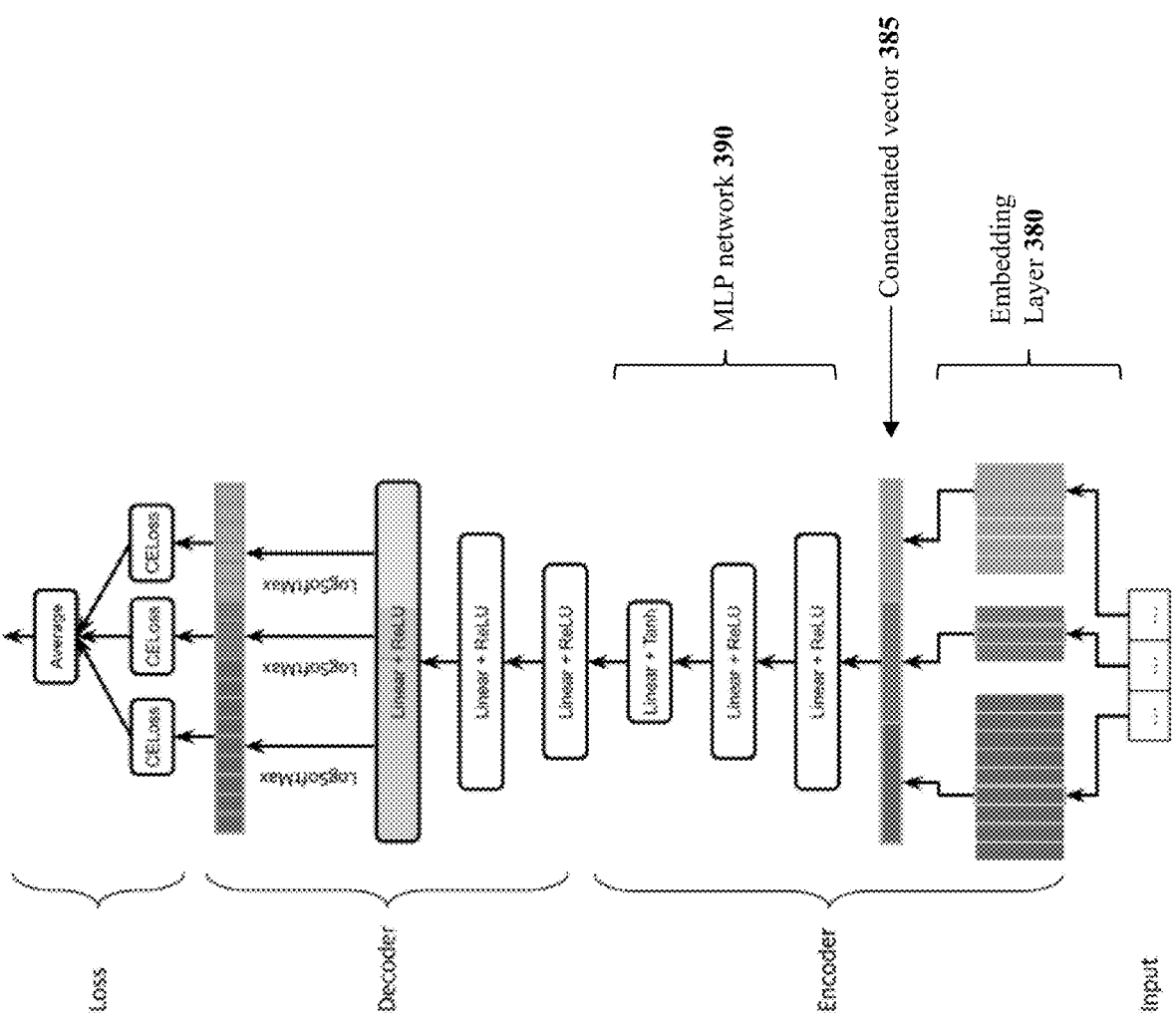
FIG. 3C illustrates an exemplary implementation of an autoencoder using ANN, in accordance with an exemplary embodiment of the present teaching.

FIG. 3B shows an exemplary multi-layer architecture for the autoencoder 320 for generating a code based on both click-attributed and non-click-attributed conversion data, in accordance with an embodiment of the present teaching. In this embodiment, the autoencoder 320 may be trained in an encoder-decoder model, in which the autoencoder 320 and a reverse decoder 340 are jointly trained to maximize the encoder's coding quality measured by, e.g., the level of loss between input features 350 (surrounding data related to an ad bid) and predicted input features 360 generated by the decoder 340 based on a code 370 generated by the encoder based on the input features 350. The multi-layer architecture of the autoencoder 320 includes various adjustable parameters and they are adjusted during training process based on the loss computed in each iteration during learning. When the loss is adequately small, the autoencoder 320 may be considered as adequately trained against the training data available. As discussed herein, the training of the autoencoder 320 may be carries out incrementally and dynamically against newly collected conversion data (both click and non-click attributed). FIG. 3C illustrates a specific exemplary ANN implementation of the autoencoder 320 and decoder 340, in accordance with an exemplary embodiment of the present teaching.

As the autoencoder according to the present teaching is trained on all conversion data (including both click and non-click attributed as well as both related and unrelated to a task at hand), the enriched performance prediction model 200 may be trained based on only relevant click-attributed data. The model 200 is enriched in the sense that because it incorporates as input the auxiliary features generated based on the code from the autoencoder 320, which embed the enriched knowledge beyond the click-attributed conversion data. Using the autoencoder's output as auxiliary input features, the task-specific prediction is built on top of the more general encoder. Since the layers in the enriched performance prediction model 200 are trained only on the task-specific data, no bias is introduced. Moreover, since the code is low-dimensional, training a low dimensional autoencoder model is potentially immune to data sparsity.

The incorporation of learned knowledge beyond the specific task learned from both click and non-click attributed conversion data provides the enriched performance prediction model 200 with valuable information about user conversion patterns exhibited in the marketplace, without having the model 200 accessing such data directly. In this manner, the performance prediction is sensitive to non-click attributed conversion patterns yet still satisfying strict latency constraints. The performance prediction using the enriched model 200 is formally described herein with respect to the OFFSET variant of factorization machine formulation in a manner that facilitate incremental training. OFFSET models generally compute a probability output (e.g., a pCVR) with the sigmoid function as below:

$$pCVR(\Omega) = \frac{1}{1 + e^{-f(\Omega)}}$$

where $\Omega$ corresponds to a user, ad and contextual properties of the given event. The function $f$ used may be broken into:

$$f(\Omega) = \langle U, A \rangle + \sum_{i \in S} w_i x_i + b$$

where U is a latent representation vector of the user and contextual features, A is a latent representation of the ad features, S is a set of potential additional features that may not be separable between the user and ad (such as how often and how recently a user has seen a particular ad), $x_i$ is an indicator for the feature i, $w_i$ is the learned weight for feature i and b is a global bias.

A continual model training process may be carried out based on latent representation for all possible combinations of user, contextual and ad features for adapting various $w_i$'s and the global bias term with the market dynamics. In some embodiments, a training process may employ a logloss function as an error function, as shown below:

$$\mathcal{L}(\Omega, y, t) = -(1 - y) \log (1 - pCVR(\Omega)) - y \log pCVR(\Omega)$$

where y is an indicator for a positive event (e.g., a click attributed conversion). This form of computation may be suitable for handling real-time inference because each ad has its pre-computed latent representation, while each user has a singular latent vector which may be calculated at the inference time.

The code 370 generated by the autoencoder 320 may be incorporated into this formal formulation. As discussed herein, the code 370 depends on both user and ad features.

As such, it may be included in the formulation in the same way that S is used. This results in the function $f$ as follows:

$$f(\Omega) = \langle U, A \rangle + \sum_{i \in S} w_i x_i + b + \langle W, C(\Omega) \rangle \quad (1)$$

where $C(\Omega)$ is the code associated with a specific event, and W is a vector of weight learned by the model as part of the training process. Learning a linear function of the code is an exemplary way to re-use the existing training in an infrastructure that is built for OFFSET models, which already include a linear term. In this learning scheme, in each model training interval, the following steps may be performed:

(1) in interval t—load the previously trained model $M_{t-1}$ and previously trained encoder $Enc_{t-1}$ (2) For each event $\Omega$, calculate the code $C=Enc_{t-1}(\Omega)$ (3) Conduct training of performance prediction model 200 by adapting model parameters (including W) using SGD according to $f(\Omega, C)$ using, e.g., a logloss error (4) Train autoencoder 320 by adapting parameters to obtain $Enc_t$ In this illustrated example for continual training, although stochastic gradient descent (SGD) is used, it is understood that it is merely for illustration purpose and does not serve as a limitation to the scope of the present teaching. Any training scheme may also be adopted for learning based on training samples. For example, adaptive gradient (AdaGrad), adaptive moment estimation (Adam), or other algorithms for adaption via continual learning may be used for the continual learning in the present teaching.

With the above formal formulation of the incremental training, some issues may need to be addressed. The first issue may relate to incremental training. The incremental learning scheme as described herein may rest on the basic premise that the model has long-term memory, and its parameters at interval t−1 constitute a good initialization point for training at interval t. If the premise substantially holds, the codes $C(\Omega)$ need to be stable, in the sense that the expectation $E\Omega [Enc_{t-2} (52)-Enc_{t-1}(\Omega)]$ is small. Otherwise, the premise may not be satisfied and vector W learned in the previous interval may encode little information useful at interval t.

Second, the expressive power of the linear function $W^T C(\Omega)$ may be weak. As discussed herein, the multiple layers of the performance prediction model 200 are on top of the autoencoder 320, which is, by itself, a multi-layer ANN. This may be needed because the separation between positive and negative samples in the encoder's latent space is often non-linear. The third issue may arise from a need in online advertising to perform fast real-time auctions. The time it takes to use an ANN for evaluating every candidate ad in an auction process introduces latency, which may often be orders of magnitude beyond the latency constraints for practical purposes. The exemplary implementation of the autoencoder 320 as illustrated in FIG. 3C addresses these issues.

Assume that data used for training the autoencoder 320 includes C categorical columns where column i has one of $n_i$ possible values. The exemplary implementation of the autoencoder 320 as shown in FIG. 3C includes first an embedding layer 380, as seen in FIG. 3C. Each column has an embedding table of dimension $n_i \times d$. The embedding vectors produced by the embedding layer 380 may then be concatenated to form a vector 385 of length C·d, which is then passed to a multi-layer perceptron (MLP) network 390 to produce the code. The hidden layers in the MLP network 390 may include ReLU activations, while the layer that produces the code uses a tanh activation to produce a code that is bounded in the unit box. Because the input to the autoencoder 320 includes categorical features, the decoder 340 is structured as a set of multi-class classifiers with a classifier of $n_i$ classes for every column. As a mirror image construct, the decoder 340 comprises similarly an MLP that transforms the code to a vector of size $$\sum_{i=1}^{C} n_i,$$

corresponding to C blocks of size $n_i$ each.

The last layer of the decoder 340 may include a log-softmax activation to each block to produce valid multi-class logits. With this decoder construct, the reconstruction loss may be the average of cross-entropy losses applied to each block. The exemplary implementation architecture as illustrated in FIG. 3C has the loss of auto-encoder M on sample $\Omega$ denoted as RecLoss(M, $\Omega$), and the code it produces denoted by Code (M, $\Omega$).

In some embodiments, the autoencoder 320 is trained in an online manner on data sub-divided into intervals $D_1$, $D_2$, . . . , training on each event only once. The incremental training process produces a sequence of autoencoder models $M_1$, $M_2$, . . . . $M_t$. The optimizer may be designed to use different optimization criteria. For example, stochastic gradient-descent may be used to optimize embeddings. Addition, product, sum of pairwise component-wise products (à la FM), sum of pairwise outer product matrices, and concatenation may also be adopted for optimization. The effectiveness of criteria used may be application dependent. In some embodiments, models may be designed with different properties in mind that may be used to evaluate the performance of the enriched performance prediction model and improvement on these properties may accordingly enhance the operation and/or outcome.

One of such properties may be to have a small reconstruction loss. In some embodiments, the aim is to achieve a reconstruction loss that is much smaller than that of uniformly distributed columns:

$$RecLoss_t \equiv \mathbb{E}_{\Omega \sim D_t}[RecLoss(M_t, \Omega)] \ll \frac{1}{C}\sum_{i=1}^{C} \ln(n_i).$$

Another property has to do with stability, i.e., to have the code produced by the autoencoder 320 in the current interval be close to the one produced in the previous interval. That is, the following quantity is made as small as possible:

$$Diff_t = \mathbb{E}_{\Omega \sim D_t}[\| Code(M_t, \Omega) - Code(M_{t-1}, \Omega)\|].$$

The next property to be achieved relates to Interval generalization. The autoencoder obtained in the previous interval needs to generalize well with respect to the samples in the current interval. Thus, the following quantity should be close to 1:

$$Gen_t = \frac{\mathbb{E}_{\Omega \sim D_t}[RecLoss(M_t, \Omega]}{\mathbb{E}_{\Omega \sim D_t}[RecLoss(M_{t-1}, \Omega]}$$

An additional property to be achieved is the ability of learning meaningful patterns. The autoencoder 320 needs to be able to reconstruct real data well, and random data badly. A random dataset $R_t$ may be of the same length as $D_t$, but with column values chosen uniformly at random from, e.g., the column's dictionary. If the reconstruction loss on $R_t$ is denoted by RecLoss $$R_t \equiv \mathbb{E}_{\Omega \sim R_t}[RecLoss(M_t, \Omega)],$$

then the random loss ratio, defined by $$RandRatio_t = \frac{RecLoss_t}{RecLoss_t^R}$$

should be or close to zero, e.g., preferably $<10^{-2}$. That is, the reconstruction of real data is orders of magnitude better than that of random data. It is noted that interval generalization Gent may be tightly related to stability $Diff_t$ because generalization likely implies stability. Intuitively, if the autoencoder trained in the last interval generalizes well the current interval's data, then its loss gradients with respect to the data in the current interval are small. In this situation, the parameters of the autoencoder 320 may not change significantly during incremental training of the current interval.

With a learned autoencoder as disclosed herein, there may be guarantee that a linear function can differentiate well between positive and negative samples in the embedding space related to the autoencoder. One exemplary remedy to enhance the representation power of the code generated by the autoencoder 320 is to transform the code. In some embodiments, in the context of incremental training scheme, random Fourier features (RFFs) may be applied as an approximation of the Gaussian radial basis function kernel to transform the code. It is observed that an RFF may suit well for an incremental learning process, as it corresponds to a simple formula for transforming the raw Code ($\Omega$) into the feature vector C($\Omega$) in Equation (1) with randomly generated matrix P and vector q:

$$C(\Omega) = \cos(P\ Code(\Omega) + q).$$

In the illustrated embodiment of the auxiliary feature generator 300, the transformation unit 330 as shown in FIG. 3A is used to transform the code from the autoencoder 320 to yield transformed auxiliary features with enhanced representation power as compared with the code.

Figure 4:
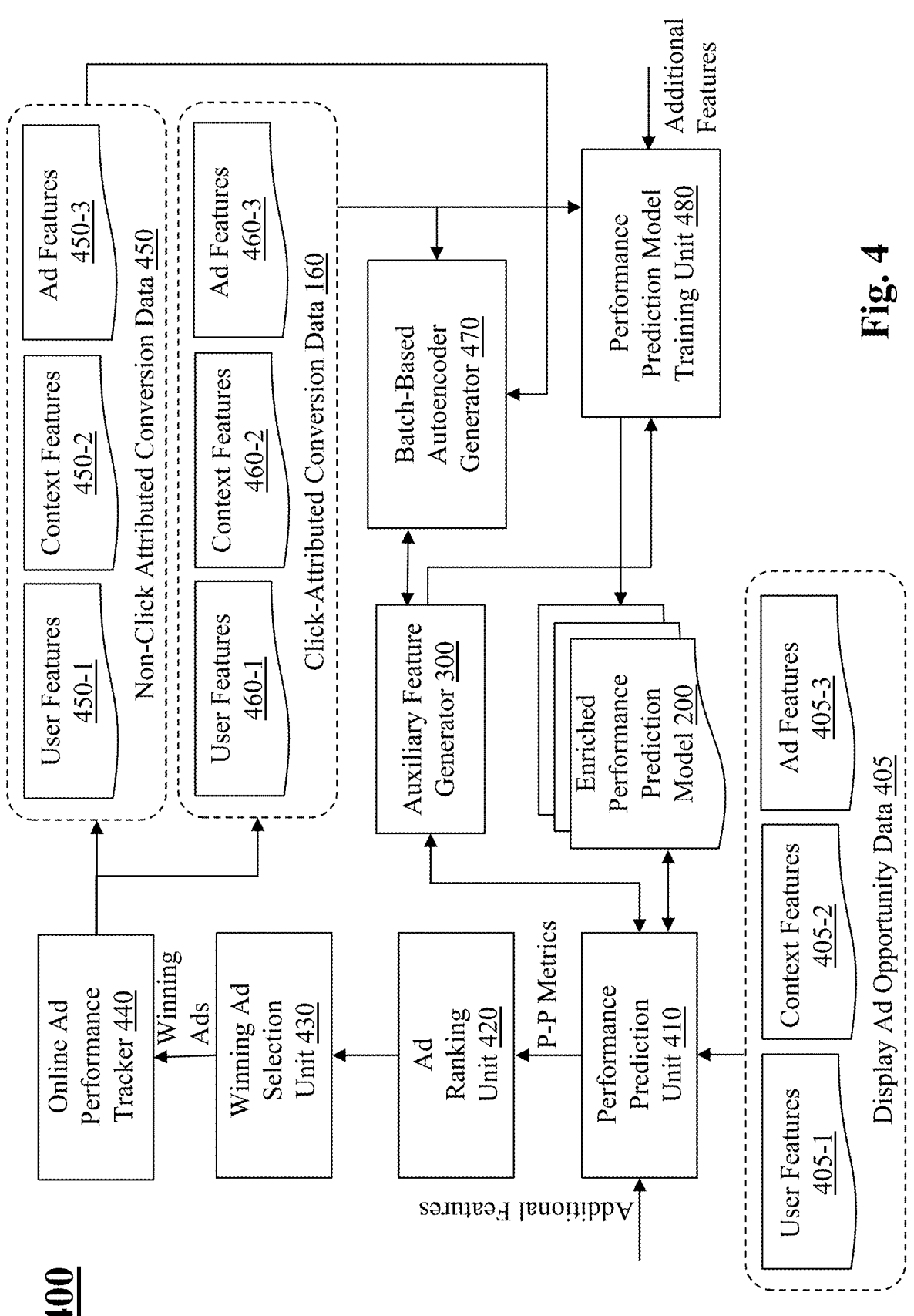
FIG. 4 depicts an exemplary high-level system diagram of a framework for selecting a winning ad via performance metrics predicted using an enriched performance prediction model, in accordance with an embodiment of the present teaching.

FIG. 4 depicts an exemplary high-level system diagram of a framework 400 for selecting a winning ad via performance metrics predicted using an enriched performance prediction model, in accordance with an embodiment of the present teaching. As compared with the conventional framework as shown in FIG. 1A, the framework 400 according to the present teaching selects a winning ad based on the predicted performance metrics for bid ads estimated using the enriched performance prediction model 200 with auxiliary features from auxiliary feature generator 300 generated based on autoencoder 320 incrementally trained using all conversion data, including both click-attributed (460) and non-click attributed (450) (without limiting to the task in hand). The framework 400 includes two parts, one for incrementally training autoencoder 320 and the enriched performance prediction model 200 and the other part for selecting, in online auction, a winning ad from bidding ads based on their rankings created according to performance metrics predicted using the enriched performance prediction model 200.

The first part of framework 400 comprises an online ad performance tracker 440, a batch-based autoencoder generator 470, and a performance prediction model training unit 480. The online ad performance tracker 440 is provided for tracking performance data associated with any winning ads that have been displayed to users, including click-attributed conversion data 460 and non-click attributed conversion data 450. In some embodiments, the data pools 450 and 460 may also include conversion data from sources other than the tracker 440. For instance, there may be third party data service providers that may collect such data in a much wider range and then provide such collected data to parties that need them. The training data in 450 and 460 may be continually supplied to support incremental training in consecutive intervals. To facilitate that, the data in 450 and 460 may be processed into batches (not shown) and each batch may be used for training in a particular interval.

When batch training data is available, the batch-based autoencoder generator 470 carries out incremental training of autoencoder 320 for the current interval based on the autoencoder 320 previously obtained in the previous interval. The batch-based autoencoder generator 470 uses next batch of the training data from both non-click-attributed data in 450 and click-attributed data in 460 for incremental training as discussed herein. The autoencoder 320 trained for the current interval may then be used to generate auxiliary features during incremental training of the enriched performance prediction model 200 for the current interval.

FIG. 5A is a flowchart of an exemplary process for the first part of the framework 400 on training the autoencoder 320 and the enriched performance prediction model 200 via training data, in accordance with an embodiment of the present teaching. In operation, performance of displayed ads is tracked, at 510, to obtain both click-attributed and non-click attributed conversion events and corresponding information about the users, ads, and contexts associated with such conversion events are collected and stored in 450 and 460. Periodically, the trained data in both 450 (non-click attributed conversion data) and 460 (click-attributed conversion data) may then be used for training to generate a new edition of the autoencoder 320 for the current interval based on the prior version of the autoencoder trained in the previous interval. The trained updated autoencoder 320 for the current interval may then be used to train the enriched performance prediction model 200 for the current interval.

To obtain a new edition of the enriched performance prediction model 200 for the current interval, the collected click-attributed conversion events in 460 are obtained at 530. For each click-attributed event, the autoencoder 320 of the current interval is used to generate, at 540, a code, which is then transformed into auxiliary features. The additional features associated with each conversion event may also be obtained. The click-attributed conversion events, the auxiliary features generated therefor, as well as corresponding additional features are then used to generate, at 550, training data for obtaining the enriched performance prediction model 200 for the current interval. Such generated training data are then used for continued training to obtain, at 560, the enriched performance prediction model 200 of the current interval.

The second part of framework 400 is for selecting a winning ad from multiple candidate ads based on the predicted performance metrics. In this illustrated embodiment, this part of the framework 400 comprises a performance prediction unit 410, the auxiliary feature generator 300, an ad ranking unit 420, and a winning ad selection unit 430. When a display ad opportunity is present, data 405 includes information surrounding the opportunity, which may include user information 405-1, ad information 405-3, and other contextual information 405-2. Such data may be used by the performance prediction unit 410 to predict, based on the enriched performance prediction model 200, the P-P metrics for the candidate ads involved in the auction. In estimating the P-P metrics, the auxiliary feature generator 300 generates auxiliary features for each candidate ad associated with the user and contextual information and such auxiliary features are provided to the enriched performance prediction model 200 to estimate the estimated performance metric (e.g., pCVR) for each ad.

The ad ranking unit 420 may then rank the candidate ads based on their respective P-P metrics and the winning ad selection unit 430 may then select a winning ad based on the ranking result. Information related to the selected winning ad may then be provided to the online ad performance tracker 440 for monitoring the user activities on displayed ads to collect click-attributed and non-click attributed conversion data for future incremental training of the autoencoder 320 and the enriched performance prediction model 200, as discussed herein.

Figure 5B:
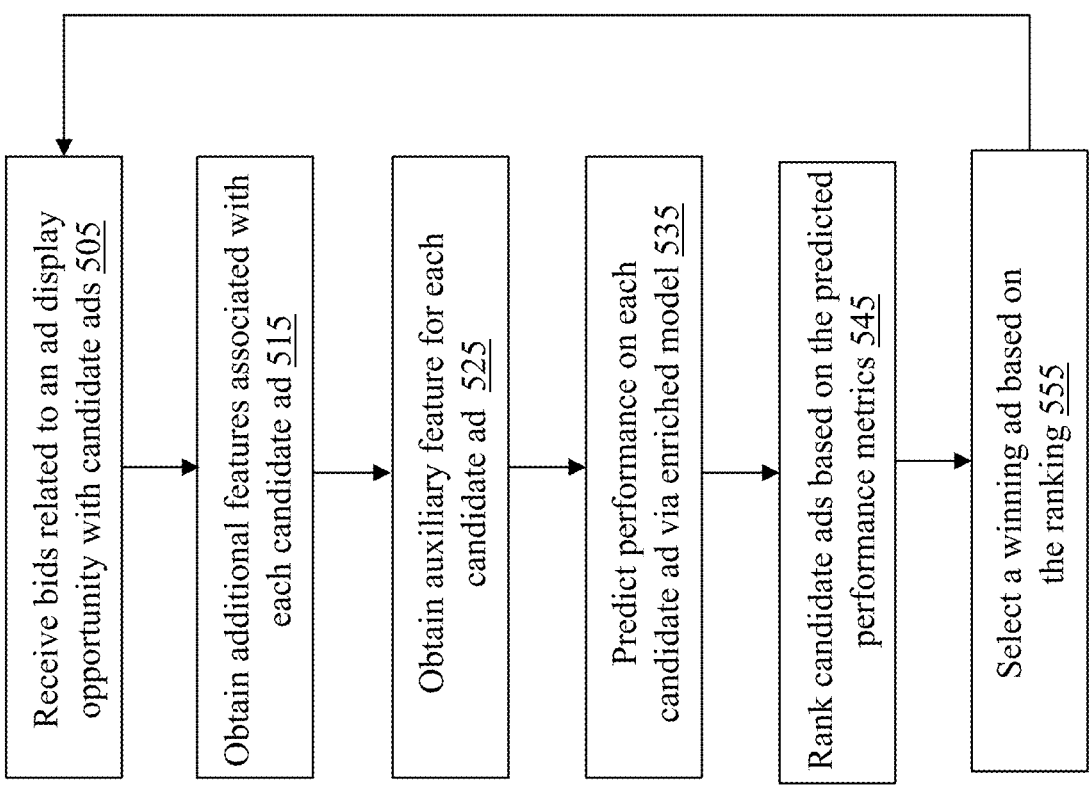
FIG. 5B is a flowchart of an exemplary process for selecting a winning ad based on performance metrics predicted using an enriched performance prediction model, in accordance with an embodiment of the present teaching.

FIG. 5B is a flowchart of an exemplary process for the second part of framework 400 on selecting a winning ad based on performance metrics predicted using the enriched performance prediction model 200, in accordance with an embodiment of the present teaching. During an ad auction process associated with a display ad opportunity, different bids are received at 505, each of which presents a candidate ad with features 405-3 thereof. Together with the ad features 405-3, user features 405-1 as well as contextual features 405-2 related to different bids for the display ad opportunity may then be provided to the performance prediction unit 410 for estimating the predicted performance metrics for candidate ads. The performance prediction unit 410 may obtain, at 515, additional features associated with each of the candidate ads. In addition, information relating to each bid (including user, ad, and context features) may be sent to the auxiliary feature generator 300 to obtain, at 525, auxiliary features needed for estimating the performance metric for each of the candidate ads. As discussed herein with reference to FIG. 3A, to generate auxiliary features for a candidate ad, the autoencoder 320 (trained for the current interval) may then generate a code based on the information related to each bid, which is then transformed by the transformation unit 330 to produce the auxiliary features for the corresponding candidate ad.

To compute the predicted performance for a candidate ad, the performance prediction unit 410 sends the information related to each bid as well as the corresponding additional features and auxiliary features for the candidate ad to the enriched performance prediction model 200, which predicts, at 535, a P-P metric for each of the candidate ads. In some embodiments, the computation of the predicted performance metric for each candidate ad is in accordance with the ANN framework as depicted in FIG. 2B, where feature vectors are generated based on information related to each bid (user, ad, and contextual features) via the first embedding layer 240 and combined by the first combine layer 250 to produce a first combined feature vector. An additional feature vector is generated based on the additional features via the second embedding layer 260, which is then combined, via the second combine layer 270, with the auxiliary features to generate a second combined feature vector. The first and the second combined feature vectors are then combined, by the third combine layer 280 to generate an overall feature vector, which is provided to the output layer 290 to produce a predicted performance metric for each candidate ad. The predicted performance metrics for the candidate ads, produced by the performance prediction unit 410, are then used by the ad ranking unit 420 to rank, at 545, all the candidate ads to produce a ranked list of candidate ads, which is used by the winning ad selection unit 430 to select, at 555, a winning ad for the auction.

Figure 6:
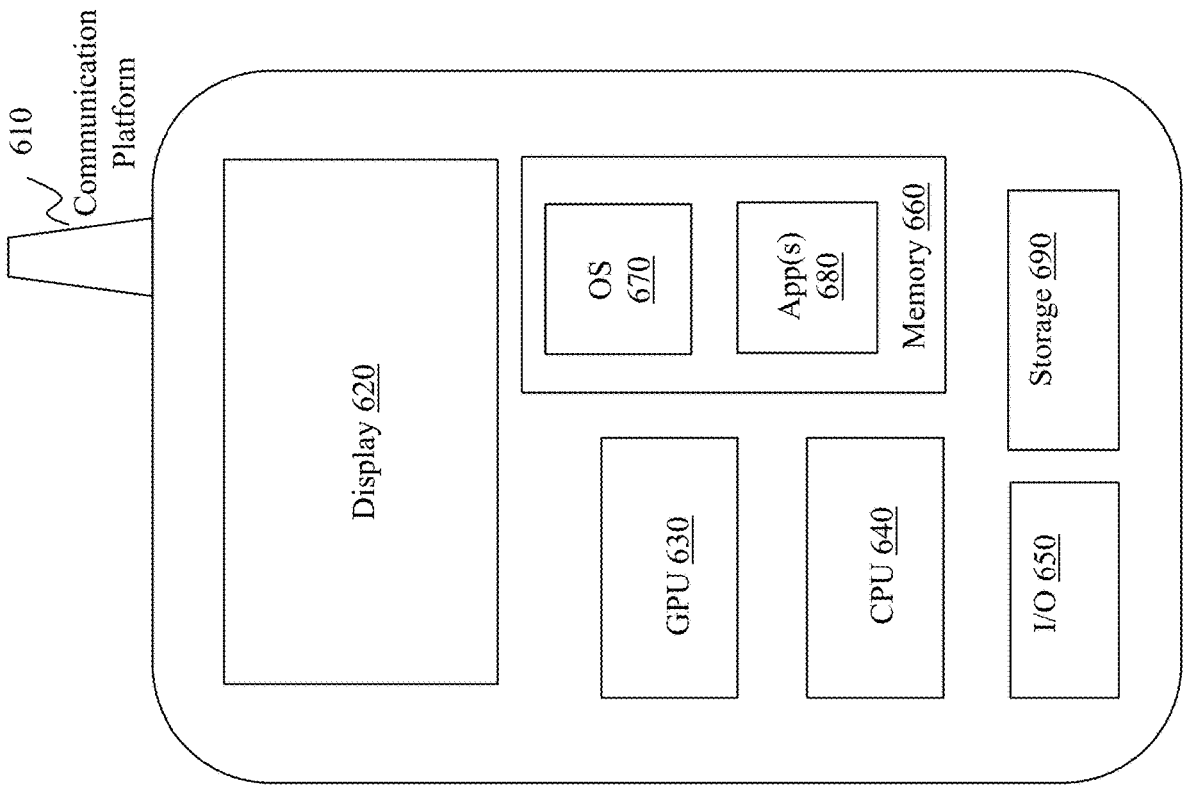
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a user interface or any other suitable mobile apps for information analytics and management according to the present teaching on, at least partially, the mobile device 600. User interactions, if any, may be achieved via the I/O devices 650 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
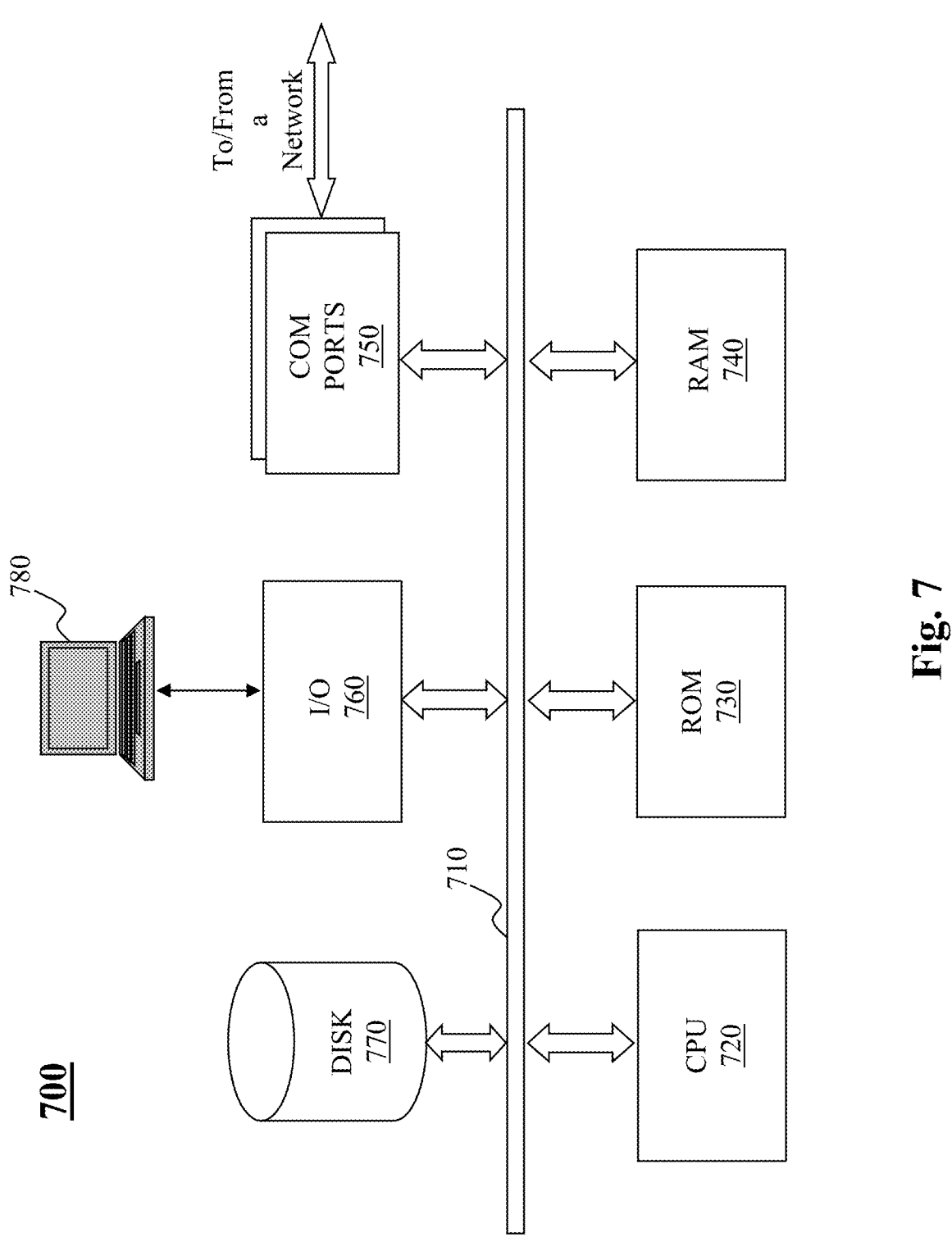
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information analytical and management method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, comprising:
receiving bids directed to a display ad opportunity, wherein each of the bids includes a candidate advertisement and the display ad opportunity involves a user and an associated context;
obtaining auxiliary features with respect to each of the bids based on a code generated by an autoencoder for the bid, wherein the autoencoder is implemented with an artificial neural network and trained based on click attributed conversion data and non-click attributed conversion data, and the click attributed conversion data and non-click attributed conversion data are collected based on online user activities on displayed ads;
predicting, via an enriched performance prediction model implemented with an artificial neural network and trained based on the click attributed conversion data, a predicted performance metric for the candidate advertisement in each of the bids based on the auxiliary features associated with the candidate advertisement; and
selecting the winning advertisement from candidate advertisements of the bids according to a ranking determined based on the respective predicted performance metrics of the candidate advertisements.

2. The method of claim 1, wherein
the auxiliary features are computed based on codes generated by the autoencoder using the click-attributed performance data.

3. The method of claim 2, wherein the click attributed and non-click attributed conversion data include events associated with a specified performance, wherein each of the events includes:
user features characterizing a user involved in the specified performance;
ad features characterizing an advertisement through which the user achieved the specified performance; and
context features characterizing contextual information associated with the user, a delivery of the advertisement, and other relevant information.

4. The method of claim 1, wherein:
the candidate advertisement is characterized by ad features;
the user associated with the display ad opportunity is characterized by user features; and
the context associated with the display ad opportunity is characterized by context features.

5. The method of claim 4, wherein the obtaining auxiliary features comprises:
accessing the ad features, the user features, and the context features;
generating, by the autoencoder, the code with respect to the bid based on the accessed ad features, user features, and context features; and
transforming the code into the auxiliary features with respect to the bid.

6. The method of claim 4, wherein the predicting a predicted performance metric comprises:
generating, via embeddings learned in training the enriched performance prediction model, ad feature vectors, user feature vectors, and context feature vectors based on respectively the ad features, the user features, and the context features;
combining the ad feature vectors, the user feature vectors, and the context feature vectors to create a first vector;
creating a second vector based on the auxiliary features;
combining the first and the second vectors to generate an overall vector; and
generating a predicted performance metric based on the overall vector.

7. The method of claim 1, further comprising:
displaying the selected advertisement to the user;
tracking response of the user to the displayed winning advertisement;
generating new training data on tracked user activities on display ads; and
conducting periodic adaptive learning of the autoencoder and the enriched performance prediction model based on the new training data.

8. A machine readable and non-transitory medium having information recorded thereon, wherein the information, when read by the machine, causes the machine to perform the following steps:
receiving bids directed to a display ad opportunity, wherein each of the bids includes a candidate advertisement and the display ad opportunity involves a user and an associated context;
obtaining auxiliary features with respect to each of the bids based on a code generated by an autoencoder for the bid, wherein the autoencoder is implemented with an artificial neural network and trained based on click attributed conversion data and non-click attributed conversion data, and the click attributed conversion data and non-click attributed conversion data are collected based on online user activities on displayed ads;

predicting, via an enriched performance prediction model implemented with an artificial neural network and trained based on the click attributed conversion data, a predicted performance metric for the candidate advertisement in each of the bids based on the auxiliary features associated with the candidate advertisement; and selecting the winning advertisement from candidate advertisements of the bids according to a ranking determined based on the respective predicted performance metrics of the candidate advertisements.

9. The medium of claim 8, wherein
the auxiliary features are computed based on codes generated by the autoencoder using the click-attributed performance data.

10. The medium of claim 9, wherein the click attributed and non-click attributed conversion data include events associated with a specified performance, wherein each of the events includes:

user features characterizing a user involved in the specified performance;

ad features characterizing an advertisement through which the user achieved the specified performance; and context features characterizing contextual information associated with the user, a delivery of the advertisement, and other relevant information.

11. The medium of claim 8, wherein:
the candidate advertisement is characterized by ad features;

the user associated with the display ad opportunity is characterized by user features; and the context associated with the display ad opportunity is characterized by context features.

12. The medium of claim 11, wherein the obtaining auxiliary features comprises:

accessing the ad features, the user features, and the context features;

generating, by the autoencoder, the code with respect to the bid based on the accessed ad features, user features, and context features; and transforming the code into the auxiliary features with respect to the bid.

13. The medium of claim 11, wherein the predicting a predicted performance metric comprises:

generating, via embeddings learned in training the enriched performance prediction model, ad feature vectors, user feature vectors, and context feature vectors based on respectively the ad features, the user features, and the context features;

combining the ad feature vectors, the user feature vectors, and the context feature vectors to create a first vector;

creating a second vector based on the auxiliary features;

combining the first and the second vectors to generate an overall vector; and generating a predicted performance metric based on the overall vector.

14. The medium of claim 8, wherein the information, when read by the machine, further causes the machine to perform the following steps:

displaying the selected advertisement to the user;

tracking response of the user to the displayed winning advertisement;

generating new training data on tracked user activities on display ads; and conducting periodic adaptive learning of the autoencoder and the enriched performance prediction model based on the new training data.

15. A system, comprising:
a performance prediction unit implemented by a processor and configured for receiving bids directed to a display ad opportunity, wherein each of the bids includes a candidate advertisement and the display ad opportunity involves a user and an associated context, and predicting, via an enriched performance prediction model implemented with an artificial neural network and trained based on click attributed conversion data, a predicted performance metric for the candidate advertisement in each of the bids based on auxiliary features with respect to each of the bids based on a code generated by an autoencoder for the bid associated with the candidate advertisement, wherein the autoencoder is implemented with an artificial neural network and trained based on the click attributed conversion data and non-click attributed conversion data, wherein the click attributed conversion data and non-click attributed conversion data are collected based on online user activities on displayed ads; and a winning ad selection unit implemented by a processor and configured for selecting the winning advertisement from candidate advertisements of the bids according to a ranking determined based on the respective predicted performance metrics of the candidate advertisements.

16. The system of claim 15, wherein
the auxiliary features are computed based on codes generated by the autoencoder using the click-attributed performance data, wherein the click attributed and non-click attributed conversion data include events associated with a specified performance, each of which includes user features characterizing a user involved in the specified performance, ad features characterizing an advertisement through which the user achieved the specified performance, and context features characterizing contextual information associated with the user, a delivery of the advertisement, and other relevant information.

17. The system of claim 15, wherein:
the candidate advertisement is characterized by ad features;

the user associated with the display ad opportunity is characterized by user features; and the context associated with the display ad opportunity is characterized by context features.

18. The system of claim 17, further comprising an auxiliary feature generator implemented 'by a processor and configured for obtaining the auxiliary features by:

accessing the ad features, the user features, and the context features;

generating, by the autoencoder, the code with respect to the bid based on the accessed ad features, user features, and context features; and transforming the code into the auxiliary features with respect to the bid.

19. The system of claim 17, wherein the performance prediction unit predicts the predicted performance metric for each candidate advertisement by:

generating, via embeddings learned in training the enriched performance prediction model, ad feature vectors, user feature vectors, and context feature vectors based on respectively the ad features, the user features, and the context features;

combining the ad feature vectors, the user feature vectors, and the context feature vectors to create a first vector;

creating a second vector based on the auxiliary features;

combining the first and the second vectors to generate an overall vector; and generating a predicted performance metric based on the overall vector.

20. The system of claim 15, further comprising an online ad performance tracker implemented by a processor and configured for tracking response of the user to the winning advertisement displayed to the user, and generating new training data on tracked user activities on display ads;

a batch-based autoencoder generator implemented by a processor and configured for conducting periodic adaptive learning of the autoencoder based on the new training data; and a performance prediction model training unit implemented by a processor and configured for conducting periodic adaptive learning of the enriched performance prediction model based on the new training data.

\* \* \* \* \*